US012763968B2

(12) United States Patent
Yavuz et al.

(10) Patent No.: US 12,763,968 B2
(45) Date of Patent: Oct. 13, 2026

(54) HARDWARE SUPPORTED AUTHENTICATION AND SIGNATURES FOR WIRELESS, DISTRIBUTED AND BLOCKCHAIN SYSTEMS

(71) Applicant: University of South Florida, Tampa, FL (US)

(72) Inventors: Attila Altay Yavuz, Tampa, FL (US); Saif Nouma, Tampa, FL (US)

(73) Assignee: University of South Florida, Tampa, FL (US)

( * ) Notice: Subject to any disclaimer, the term of this patent is extended or adjusted under 35 U.S.C. 154(b) by 216 days.

(21) Appl. No.: 18/188,749

(22) Filed: Mar. 23, 2023

(65) Prior Publication Data

US 2023/0308289 A1 Sep. 28, 2023

Related U.S. Application Data

(60) Provisional application No. 63/269,779, filed on Mar. 23, 2022.

(51) Int. Cl.

| | |
|---|---|
| ***H04L 9/40*** | (2022.01) |
| ***H04L 9/08*** | (2006.01) |
| ***H04L 9/32*** | (2006.01) |

(52) U.S. Cl.

CPC .......... *H04L 9/3247* (2013.01); *H04L 9/0825* (2013.01); *H04L 9/3236* (2013.01)

(58) Field of Classification Search

None

See application file for complete search history.

(56) References Cited

U.S. PATENT DOCUMENTS

| | | | | |
|---|---|---|---|---|
| 2003/0046238 A1* | 3/2003 | Nonaka | H04L 9/083 380/282 |
| 2007/0030974 A1* | 2/2007 | Ishibashi | H04L 9/3247 380/281 |
| 2019/0289468 A1* | 9/2019 | Idnani | H04W 48/16 |

OTHER PUBLICATIONS

David A. Cooper, "NIST Special Publication 800-208, Recommendation for Stateful Hash-Based Signature Schemes" Natl. Inst. Stand. Technol. Spec. Publ. 800-208, 59 pages (Oct. 2020) Coden: NSPUE2 (Year: 2020).*

Sattam S. Al-Riyami and Kenneth G. Paterson. Certificateless public key cryptography. In Chi-Sung Laih, editor, Advances in Cryptology—ASIACRYPT 2003, pp. 452-473, Berlin, Heidelberg, 2003. Springer Berlin Heidelberg.

Tiago Alves. Trustzone : Integrated hardware and software security. 2004.

(Continued)

*Primary Examiner* — Jeffrey C Pwu

*Assistant Examiner* — Mayasa A. Shaawat

(74) *Attorney, Agent, or Firm* — Meunier Carlin & Curfman LLP

(57) ABSTRACT

Systems and methods for efficient cryptographic signing in heterogeneous systems that include IoT or other resource-limited devices. A signer which is the resource-limited device is not expected to generate, store and/or communicate expensive commitment values and/or public keys. A secure hardware platform serves as PUblic nonce-Commitment-Key Oracle (PUCKO) that computes and transmits commitments (e.g., one-time public key keys, ephemeral algebraic commitments) on behalf of the signer(s) to verifiers (or other signers in distributed signatures).

16 Claims, 4 Drawing Sheets

(56) References Cited

OTHER PUBLICATIONS

Jean-Philippe Aumasson, Luca Henzen, Willi Meier, and Raphael C.-W. Phan. Sha-3 proposal blake. Submission to NIST (Round 3), 2010.
Jean-Philippe Aumasson, Samuel Neves, Zooko Wilcox-O'Hearn, and Christian Winnerlein. Blake2: Simpler, smaller, fast as md5. In Michael Jacobson, Michael Locasto, Payman Mohassel, and Reihaneh Safavi-Naini, editors, Applied Cryptography and Network Security, pp. 119-135. Springer Berlin Heidelberg, 2013.
Christian Badertscher, Peter Gazi, Aggelos Kiayias, Alexander Russell, and Vassilis Zikas. Ouroboros genesis: Composable proof-of-stake blockchains with dynamic availability. In Proceedings of the 2018 ACM SIGSAC Conference on Computer and Communications Security, CCS '18, p. 913-930, New York, NY, USA, 2018. Association for Computing Machinery.
Rouzbeh Behnia, Muslum Ozgur Ozmen, Attila A. Yavuz, and Mike Rosulek. Tachyon: Fast signatures from compact knapsack. In Proceedings of the 2018 ACM SIGSAC Conference on Computer and Communications Security, CCS '18, pp. 1855-1867, New York, NY, USA, 2018. ACM.
Rouzbeh Behnia, Attila Altay Yavuz, Muslum O. Ozmen, and Tsz Hon Yuen. Compatible certificateless and identity-based cryptosystems for heterogeneous IoT. In Information Security Conference (ISC), pp. 39-58, Cham, 2020. Springer International Publishing.
Rouzbeh Behnia and Attilla Altay Yavuz. Towards Practical Post-Quantum Signatures for Resource-Limited Internet of Things, p. 119-130. Association for Computing Machinery, New York, NY, USA, 2021.
M. Bellare and S. Miner. A forward-secure digital signature scheme. In Advances in Crpytology (CRYPTO '99), pp. 431-448. Springer-Verlag, 1999.
M. Bellare and P. Rogaway. Introduction to modern cryptography. In UCSD CSE Course, p. 207. 1st edition, 2005. http://www.cs.ucsd.edu/~mihir/cse207/classnotes.html.
Mihir Bellare, Chanathip Namprempre, and Gregory Neven. Security proofs for identity-based identification and signature schemes. Journal of Cryptology, 22(1):1-61, Jan. 2009.
Mihir Bellare, Haixia Shi, and Chong Zhang. Foundations of group signatures: The case of dynamic groups. In Alfred Menezes, editor, Topics in Cryptology—CT-RSA 2005, pp. 136-153, Berlin, Heidelberg, 2005. Springer Berlin Heidelberg.
Daniel J. Bernstein, Daira Hopwood, Andreas Hu¨lsing, Tanja Lange, Ruben Niederhagen, Louiza Pa-pachristodoulou, Michael Schneider, Peter Schwabe, and Zooko Wilcox-O'Hearn. SPHINCS: Practical stateless hash-based signatures. In Advances in Cryptology—EUROCRYPT 2015: 34th Annual International Conference on the Theory and Applications of Cryptographic Techniques, pp. 368-397. Springer Berlin Heidelberg, Apr. 2015.
Daniel J. Bernstein, Andreas Hu¨lsing, Stefan Ko¨lbl, Ruben Niederhagen, Joost Rijneveld, and Peter Schwabe. The sphincs+ signature framework. In Proceedings of the 2019 ACM SIGSAC Conference on Computer and Communications Security, CCS '19, p. 2129-2146, New York, NY, USA, 2019. Association for Computing Machinery.
Jo Best. Could implanted medical devices be hacked? BMJ, 368, 2020.
Ward Beullens, Samuel Dobson, Shuichi Katsumata, Yi-Fu Lai, and Federico Pintore. Group signatures and more from isogenies and lattices: Generic, simple, and efficient. Cryptology ePrint Archive, Report 2021/1366, 2021. https://ia.cr/2021/1366.
Dan Boneh, Ben Lynn, and Hovav Shacham. Short signatures from the weil pairing. In Colin Boyd, editor, Advances in Cryptology—ASIACRYPT 2001, pp. 514-532, Berlin, Heidelberg, 2001. Springer Berlin Heidelberg.
Julia Borghoff, Anne Canteaut, Tim Gu¨neysu, Elif Bilge Kavun, Miroslav Knezevic, Lars R. Knudsen, Gregor Leander, Ventzislav Nikov, Christof Paar, Christian Rechberger, Peter Rombouts, Søren S. Thomsen, and Tolga Yalcin. Prince: A low-latency block cipher for pervasive computing applications. In Proceedings of the 18th International Conference on The Theory and Application of Cryptology and Information Security, ASIACRYPT'12, pp. 208-225, Berlin, Heidelberg, 2012. Springer-Verlag.
Angele Bossuat and Xavier Bultel. Unlinkable and invisible γ-sanitizable signatures. In Kazue Sako and Nils Ole Tippenhauer, editors, Applied Cryptography and Network Security, pp. 251-283, Cham, 2021. Springer International Publishing.
Ernie Brickell and Jiangtao Li. Enhanced privacy id: A direct anonymous attestation scheme with enhanced revocation capabilities. In Proceedings of the 2007 ACM Workshop on Privacy in Electronic Society, WPES '07, p. 21-30, New York, NY, USA, 2007. Association for Computing Machinery.
Johannes Buchmann, Erik Dahmen, Sarah Ereth, Andreas Hu¨lsing, and Markus Ru¨ckert. On the security of the winternitz one-time signature scheme. In International conference on cryptology in Africa, pp. 363-378. Springer, 2011.
Johannes Buchmann, Erik Dahmen, and Andreas Hu¨lsing. Xmss—a practical forward secure signature scheme based on minimal security assumptions. In Proceedings of the 4th International Conference on Post-Quantum Cryptography, PQCrypto'11, pp. 117-129, Berlin, Heidelberg, 2011. Springer-Verlag.
J. Coron and D. Naccache. Boneh et al.'s k-element aggregate extraction assumption is equivalent to the diffie-hellman assumption. In Proceedings of the 9th International Conference on the Theory and Application of Cryptology (ASIACRYPT 03'), pp. 392-397, 2003.
Craig Costello and Patrick Longa. Four Q : Four-dimensional decompositions on a Q-curve over the mersenne prime. In Tetsu Iwata and Jung Hee Cheon, editors, Advances in Cryptology—ASIACRYPT 2015, pp. 214-235. Springer Berlin Heidelberg, 2015.
Elizabeth Crites, Chelsea Komlo, and Mary Maller. How to prove schnorr assuming schnorr: Security of multi- and threshold signatures. Cryptology ePrint Archive, Report 2021/1375, 2021. https: //ia.cr/2021/1375.
E. Cronin, S. Jamin, T. Malkin, and P. McDaniel. On the performance, feasibility, and use of forward-secure signatures. In Proceedings of the 10th ACM Conference on Computer and Communications Security (CCS '03), pp. 131-144. ACM, 2003.
S. Crosby and D. S. Wallach. Efficient data structures for tamper evident logging. In Proceedings of the 18th conference on USENIX Security Symposium, Aug. 2009.
O. Delgado-Mohatar, J. M. Sierra, L. Brankovic, and A. Fuster-Sabater. An energy-efficient symmetric cryptography based authentication scheme for wireless sensor networks. In Proceedings of the 4th IFIP WG 11.2 International conference on Information Security Theory and Practices: Security and Privacy of Pervasive Systems and Smart Devices, WISTP'10, pp. 332-339. Springer-Verlag, 2010.
Leo Ducas, Eike Kiltz, Tancrede Lepoint, Vadim Lyubashevsky, Peter Schwabe, Gregor Seiler, and Damien Stehle. Crystals-dilithium: A lattice-based digital signature scheme. IACR Transactions on Cryptographic Hardware and Embedded Systems, 2018(1):238-268, Feb. 2018.
Ben Fisch, Dhinakaran Vinayagamurthy, Dan Boneh, and Sergey Gorbunov. Iron: Functional encryption using intel sgx. In Proceedings of the 2017 ACM SIGSAC Conference on Computer and Communications Security, CCS '17, p. 765-782, New York, NY, USA, 2017. Association for Computing Machinery.
Gurjot Singh Gaba, Gulshan Kumar, Tai-Hoon Kim, Himanshu Monga, and Pardeep Kumar. Secure device-to-device communications for 5g enabled internet of things applications. Computer Communications, 169:114-128, 2021.
Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, p. 51-68, New York, NY, USA, 2017. Association for Computing Machinery.
O. Goldreich, S. Goldwasser, and S. Micali. How to construct random functions. Journal of the ACM, 33(4):792-807, Oct. 1986.
D. Hankerson, A. Menezes, and S. Vanstone. Guide to Elliptic Curve Cryptography. Springer, 2004.
Gunnar Hartung. Attacks on secure logging schemes. In Financial Cryptography and Data Security, pp. 268-284, Cham, 2017. Springer International Publishing.

(56) References Cited

OTHER PUBLICATIONS

Ying He, Ruben Suxo Camacho, Hasan Soygazi, and Cunjin Luo. Attacking and defence pathways for intelligent medical diagnosis system (imds). International Journal of Medical Informatics, 148:104415, 2021.
Mustapha Hedabou and Yunusa Simpa Abdulsalam. Efficient and secure implementation of bls multisignature scheme on tpm. In 2020 IEEE International Conference on Intelligence and Security Informatics (ISI), pp. 1-6, 2020.
J. E. Holt. Logcrypt: Forward security and public verification for secure audit logs. In Proc. of the 4th Australasian workshops on Grid computing and e-research (ACSW '06), pp. 203-211, 2006.
Andreas Hu¨lsing, Lea Rausch, and Johannes Buchmann. Optimal parameters for xmss mt. In International conference on availability, reliability, and security, pp. 194-208. Springer, 2013.
Andreas Hu¨lsing, Joost Rijneveld, and Peter Schwabe. Armed sphincs. In Proceedings, Part I, of the 19th IACR International Conference on Public-Key Cryptography—PKC 2016—vol. 9614, pp. 446-470, Berlin, Heidelberg, 2016. Springer-Verlag.
Gene Itkis and Leonid Reyzin. Forward-secure signatures with optimal signing and verifying. In Proceedings of the 21st Annual International Cryptology Conference on Advances in Cryptology, CRYPTO '01, p. 332-354, Berlin, Heidelberg, 2001. Springer-Verlag.
C. Jean-Sebastien. On the exact security of full domain hash. In Advances in Crpytology (CRYPTO '00), pp. 229-235. Springer-Verlag, 2000.
Don Johnson, Alfred Menezes, and Scott Vanstone. The elliptic curve digital signature algorithm (ecdsa). International Journal of Information Security, 1(1):36-63, Aug. 2001.
Daniel Kales and Greg Zaverucha. Improving the performance of the picnic signature scheme. Cryptology ePrint Archive, Report 2020/427, 2020. https://ia.cr/2020/427.
Panos Kampanakis and Attila A. Yavuz. BAFi: A practical cryptographic secure audit logging scheme for digital forensics. Security and Communication Networks, pages n/a-n/a, Mar. 2015.
Jonathan Katz and Andrew Y. Lindell. Aggregate Message Authentication Codes, pp. 155-169. Springer Berlin Heidelberg, Berlin, Heidelberg, 2008.
Akinori Kawachi, Keisuke Tanaka, and Keita Xagawa. Concurrently secure identification schemes based on the worst-case hardness of lattice problems. In Josef Pieprzyk, editor, Advances in Cryptology.
S. L. Keoh, S. S. Kumar, and H. Tschofenig. Securing the internet of things: A standardization perspective. IEEE Internet of Things Journal, 1(3):265-275, Jun. 2014.
J. Lee, S. Kim, Y. Cho, Y. Chung, and Y. Park. HORSIC: An efficient one-time signature scheme for wireless sensor networks. Information Processing Letters, 112(20):783 -787, 2012.
Jaeheung Lee and Yongsu Park. Horsic+: An efficient post-quantum few-time signature scheme. Applied Sciences, 11(16):7350, 2021.
Yunji Liang, Xin Wang, Zhiwen Yu, Bin Guo, Xiaolong Zheng, and Sagar Samtani. Energy-efficient collaborative sensing: Learning the latent correlations of heterogeneous sensors. ACM Trans. Sen. Netw., 17(3), Jun. 2021.
Vadim Lyubashevsky and Daniele Micciancio. Asymptotically efficient lattice-based digital signatures. In Ran Canetti, editor, Theory of Cryptography, pp. 37-54, Berlin, Heidelberg, 2008. Springer Berlin Heidelberg.
D. Ma. Practical forward secure sequential aggregate signatures. In Proceedings of the 3rd ACM symposium on Information, Computer and Communications Security (ASIACCS '08), pp. 341-352, NY, USA, 2008. ACM.
D. Ma and G. Tsudik. Forward-secure sequential aggregate authentication. In Proceedings of the 28th IEEE Symposium on Security and Privacy (S&P '07), pp. 86-91, May 2007.
Di Ma and Gene Tsudik. A new approach to secure logging. Trans. Storage, 5(1):2:1-2:21, Mar. 2009.
T. Malkin, D. Micciancio, and S. K. Miner. Efficient generic forward-secure signatures with an unbounded number of time periods. In Proc. of the 21th International Conference on the Theory and Applications of Cryptographic Techniques (EUROCRYPT '02), pp. 400-417. Springer-Verlag, 2002.
Gregory Maxwell, Andrew Poelstra, Yannick Seurin, and Pieter Wuille. Simple schnorr multi-signatures with applications to bitcoin. Des. Codes Cryptogr., 87(9):2139-2164, 2019.
Frank McKeen, Ilya Alexandrovich, Ittai Anati, Dror Caspi, Simon Johnson, Rebekah Leslie-Hurd, and Carlos Rozas. Intel® software guard extensions (intel® sgx) support for dynamic memory management inside an enclave. In Proceedings of the Hardware and Architectural Support for Security and Privacy 2016, HASP 2016, New York, NY, USA, 2016. Association for Computing Machinery.
Y. Mu, W. Susilo, and H. Zhu. Compact sequential aggregate signatures. In Proceedings of the 22nd ACM symposium on Applied computing (SAC '07), pp. 249-253. ACM, 2007.
D. Naccache, D. M'Ra¨ihi, S. Vaudenay, and D. Raphaeli. Can D.S.A. be improved? Complexity trade-offs with the digital signature standard. In Proceedings of the 13th International Conference on the Theory and Application of Cryptographic Techniques (EUROCRYPT '94), pp. 77-85, 1994.
Jonas Nick, Tim Ruffing, Yannick Seurin, and Pieter Wuille. MuSig-DN: Schnorr Multi-Signatures with Verifiably Deterministic Nonces, p. 1717-1731. Association for Computing Machinery, New York, NY, USA, 2020.
NIST. PQC standardization process: Second round candidate announcement. https://csrc. nist.gov/News/2019/pqc-standardization-process-2nd-round-candidates, 2019. Last Accessed on Sep. 17, 2019.
National Institute of Standards and Technology. Digital signature standard (DSS). FIPS PUB 186-5 (Draft), Oct. 2019. https://nvlpubs. nist.gov/nistpubs/FIPS/NIST.FIPS. 186-5-draft.pdf.
National Institute of Standards and Technology. Status report on the second round of the NIST Lightweight Cryptography Standardization process. NISTIR 8369, Jul. 2021. https://csrc. nist.gov/publications/detail/nistir/8369/final.
Muslum Ozgur Ozmen, Attila A. Yavuz, and Rouzbeh Behnia. Energy-aware digital signatures for embedded medical devices. In 2019 IEEE Conference on Communications and Network Security (CNS), pp. 55-63, 2019.
Krishna Pabbuleti, Deepak Mane, and Patrick Schaumont. Energy budget analysis for signature proto-cols on a self-powered wireless sensor node. In Radio Frequency Identification: Security and Privacy Issues: 10th International Workshop, RFIDSec 2014, Oxford, UK, Jul. 21-23, 2014, Cham. Springer International Publishing.
Mahbubur Rahman and Hamid Jahankhani. Security Vulnerabilities in Existing Security Mechanisms for IoMT and Potential Solutions for Mitigating Cyber-Attacks, pp. 307-334. Springer International Publishing, Cham, 2021.
Leonid Reyzin and Natan Reyzin. Better than biba: Short one-time signatures with fast signing and verifying. In Lynn Batten and Jennifer Seberry, editors, Information Security and Privacy, pp. 144-153. Springer Berlin Heidelberg, 2002.
R.L. Rivest, A. Shamir, and L.A. Adleman. A method for obtaining digital signatures and public-key cryptosystems. Communications of the ACM, 21(2):120-126, 1978.
Michael Rushanan, Aviel D. Rubin, Denis Foo Kune, and Colleen M. Swanson. Sok: Security and privacy in implantable medical devices and body area networks. In Proceedings of the 2014 IEEE Symposium on Security and Privacy, SP '14, pp. 524-539. IEEE Computer Society, 2014.
Ahmad-Reza Sadeghi, Christian Wachsmann, and Michael Waidner. Security and privacy challenges in industrial internet of things. In Proceedings of the 52Nd Annual Design Automation Conference, DAC '15, pp. 54:1-54:6. ACM, 2015.
Alessandra Scafuro and Bihan Zhang. One-time traceable ring signatures. In Elisa Bertino, Haya Shulman, and Michael Waidner, editors, Computer Security—ESORICS 2021, pp. 481-500, Cham, 2021. Springer International Publishing.
B. Schneier and J. Kelsey. Secure audit logs to support computer forensics. ACM Transaction on Information System Security, 2(2):159-176, 1999.
C. Schnorr. Efficient signature generation by smart cards. Journal of Cryptology, 4(3):161-174, 1991.

(56) References Cited

OTHER PUBLICATIONS

Nicolas Serrano, Hilda Hadan, and L. Jean Camp. A complete study of p.k.i. (pki's known incidents). In The 47th Research Conference on Communications, Information, and Internet Policy. TPRC, 2019.

Efe U. A. Seyitoglu, Attila A. Yavuz, and Muslum O. Ozmen. Compact and resilient cryptographic tools for digital forensics. In 2020 IEEE Conference on Communications and Network Security (CNS), pp. 1-9, 2020.

Peter W. Shor. Polynomial-time algorithms for prime factorization and discrete logarithms on a quantum computer. SIAM Review, 41(2):303-332, 1999.

Victor Shoup. A proposal for an ISO standard for public key encryption. IACR Cryptology ePrint Archive, 2001:112, 2001.

Ankush Singla, Rouzbeh Behnia, Syed Rafiul Hussain, Attila Yavuz, and Elisa Bertino. Look before you leap: Secure connection bootstrapping for 5g networks to defend against fake base-stations. ASIA CCS '21, p. 501-515, New York, NY, USA, 2021. Association for Computing Machinery.

Shi-Feng Sun, Man Ho Au, Joseph K. Liu, and Tsz Hon Yuen. Ringct 2.0: A compact accumulator-based (linkable ring signature) protocol for blockchain cryptocurrency monero. In Simon N. Foley, Dieter Gollmann, and Einar Snekkenes, editors, Computer Security—ESORICS 2017, pp. 456-474, Cham, 2017. Springer International Publishing.

Shifeng Sun, Udaya Parampalli, Tsz Hon Yuen, Yu Yu, and Dawu Gu. Efficient completely non-malleable and RKA secure public key encryptions. pp. 134-150, 2016.

Welcome to Tari Labs University (TLU). The musig schnorr signature scheme. Webpage, 2022.

Jongho Won, Seung-Hyun Seo, and Elisa Bertino. Certificateless cryptographic protocols for efficient drone-based smart city applications. IEEE Access, 5:3721-3749, 2017.

A. Yavuz and M. O. Ozmen. Ultra lightweight multiple-time digital signature for the internet of things devices. IEEE Transactions on Services Computing, pp. 1-1, 2019.

Attila A. Yavuz. System and method of audit log protection. Assigned to University of South Florida, U.S. Pat. No. 10,587,416B1, Patent Granted: Mar. 10, 2020.

Attila A. Yavuz. ETA: Efficient and tiny and authentication for heterogeneous wireless systems. In Proceedings of the sixth ACM conference on Security and privacy in wireless and mobile networks, WiSec '13, pp. 67-72, New York, NY, USA, Apr. 2013. ACM.

Attila A. Yavuz and Peng Ning. BAF: An efficient publicly verifiable secure audit logging scheme for distributed systems. In Proceedings of the 2009 Annual Computer Security Applications Conference, ACSAC '09, pp. 219-228. IEEE Computer Society, 2009.

Attila A. Yavuz, Peng Ning, and Michael K. Reiter. BAF and FI-BAF: Efficient and publicly verifiable cryptographic schemes for secure logging in resource-constrained systems. ACM Transaction on Information System Security, 15(2), 2012.

Attila A. Yavuz, Peng Ning, and Michael K. Reiter. Efficient, compromise resilient and append-only cryptographic schemes for secure audit logging. In Financial Cryptography and Data Security (FC 2012), vol. 7397 of Lecture Notes in Computer Science, pp. 148-163. Mar. 2012.

Attila A. Yavuz and Muslum O. Ozmen. Ultra lightweight multiple-time digital signature for the internet of things devices. IEEE Transactions on Services Computing, (01):1-1, jul 5555.

Youngho Yoo, Reza Azarderakhsh, Amir Jalali, David Jao, and Vladimir Soukharev. A post-quantum digital signature scheme based on supersingular isogenies. In Aggelos Kiayias, editor, Financial Cryptography and Data Security, pp. 163-181, Cham, 2017. Springer International Publishing.

G.M. Zaverucha and D.R. Stinson. Short one-time signatures. Cryptology ePrint Archive, Report 2010/446, 2010. https://eprint.iacr.org/2010/446.

F. Zhang and K. Kim. Id-based blind signature and ring signature from pairings. In Proceedings of the 8th International Conference on the Theory and Application of Cryptology and Information Security: Advances in Cryptology, vol. 2501 of LNCS, pp. 533-547, 2002.

* cited by examiner

HARDWARE SUPPORTED AUTHENTICATION AND SIGNATURES FOR WIRELESS, DISTRIBUTED AND BLOCKCHAIN SYSTEMS

CROSS-REFERENCE TO RELATED APPLICATION

This application claims priority to U.S. Provisional Patent Application No. 63/269,779, filed Mar. 23, 2022, entitled "HARDWARE SUPPORTED AUTHENTICATION AND SIGNATURES FOR WIRELESS, DISTRIBUTED AND BLOCKCHAIN SYSTEMS," the disclosure of which is incorporated by reference in its entirety.

STATEMENT OF GOVERNMENT SUPPORT

This invention was made with government support under 1917627 awarded by the National Science Foundation. The government has certain rights in the invention.

BACKGROUND

The emerging Internet of Things (IoT) systems, integrated with next-generation wireless and/or distributed applications, shall play a pivotal role in shaping the future cyber-systems. IoTs are expected to harbor several billions of embedded devices, many of which are highly resource-limited such as medical embedded devices and smart-home/city sensors. Yet, they are expected to operate for long durations without interruptions while gathering, processing, and transmitting highly security/privacy-sensitive information. Therefore, it is of paramount importance to ensure the cyber-security of emerging IoT systems. Consider a heterogeneous healthcare IoT application, wherein a large number of different medical devices (e.g., embedded/wearable sensors, handheld tablets) gather highly sensitive data from patients and then report it to the doctors, hospital, and insurance companies for diagnosis and analysis. It is a highly challenging yet critical task to ensure the trustworthiness of such systems, which produces a sheer amount of sensitive information under resource limitations (e.g., battery, CPU, memory) and in the presence of active adversaries.

Currently, there are two main lines of cryptographic techniques applied to wireless systems in general and IoTs in specific pertaining any sensitive information, which are discussed below.

Symmetric Cryptography based Secure Audit Logging Approaches

Many symmetric key-based techniques rely on Message Authentication Codes and symmetric ciphers. Some of these techniques offer forward-security, aggregation, and all-or-nothing property that permit a high level of security/privacy for the audit log. Furthermore, all these advanced security features are usually offered via a few Pseudo Random Function (PRF) and cryptographic hash calls. As a result, these primitives are near-optimal computational efficient with small authentication tags, which make them an ideal choice for protecting data on resource-limited IoT platforms in terms of cost-efficiency.

Despite their high efficiency, symmetric cryptography based approaches have several drawbacks that may limit their application to several important IoT applications. That is, they cannot achieve public verifiability and non-repudiation, since the signer/encryptor and verifier(s) share the same symmetric key. This prevents the resolution of disputes requiring public audit, a vital feature for digital forensics. The symmetric primitives are not scalable for systems with a large number of components due to key management and distribution hurdles. Moreover, they are vulnerable to key compromises in central architectures. For example, assume that the medical cloud system gathering the audit logs is compromised. This may expose the symmetric keys used in medical IoT devices, thereby undermining the security and privacy of millions of users.

The Cost of Digital Signatures with Advanced Properties

Digital signatures and public key encryption rely on Public Key Infrastructures (PKI), and therefore are scalable for massive IoT applications. Moreover, digital signatures achieve public verifiability and non-repudiation. These make them a suitable choice for IoT applications that involve financial transactions and/or other sensitive information (e.g., medical, personal data). Despite these advantages, Public Key Cryptography (PKC)-based approaches incur very heavy overhead, especially when advanced security properties are considered. Traditional digital signatures (e.g., ECDSA, RSA) and PKC encryption have been used to secure audit logs. These basic approaches have several main limitations. PKC-based signature and/or encryption require costly operations (e.g., exponentiations, elliptic curve scalar multiplications) that are several magnitudes of times costlier than symmetric cryptography based approaches. Moreover, they do not offer advanced features such as forward-security and aggregation, which are important to enhance the security and compactness of the cryptographic payload.

The achievement of advanced features substantially increases the cryptographic overhead, which might not be practical for heterogeneous IoT applications. For example, forward security ensures the authenticity and integrity of the data items before an attack point. It is achieved by evolving the secret key periodically (e.g., per signing). Forward secure signatures can substantially enhance the breach resiliency, and therefore have various applications in IoTs and forensics. However, they introduce a new signature and/or public key per log entry, and therefore incur a high computation and storage/transmission overhead. FOrward-secure and Aggregate Signatures (FOSA) permit authentication tag aggregation that reduces the storage/transmission overhead. Some FOSA schemes also offer "all-or-nothing" property, which ensures the integrity of entire log trail to prevent re-ordering and selective deletion. Various FOSA schemes have been developed with several performance and security trade-offs. FssAgg were the first FOSA schemes, but their variants with sub-linear signature and public key sizes were flawed. FssAgg-BLS is a K-time signature scheme with O(K) public key size. It also requires a cryptographic pairing per message verification, and therefore is costly. Later, BAF schemes have been proposed, which are currently the most computationally efficient alternatives but still require O(K) public key size. CORE scheme in achieves sub-linear key and signature sizes but requires multiple EC scalar multiplications both at the logger and verifier sides.

There are several digital signatures with post-quantum promises, some of the most prominent ones in NIST PQC Standardization effort. Currently, the lattice-based alternatives offer the most balanced signing efficiency, signature and key sizes and verification efficiency among all the NIST competitors. However, it has been shown that their signing is still highly expensive for low-end IoTs. Hash-based signatures offer high-security but have very large signature sizes and highly costly signing. XMSS offers forward-security as a K-time stateful signature scheme for large K, but with highly expensive signing and verification costs.

One-time signatures can offer highly efficient signature generation with post-quantum security (e.g., small signature sizes). However, a private/public key pair can be used only once (or a few times), which significantly limits their practical uses. One can transform a one-time signature into K-time by pre-computing and storing corresponding public key pairs to attend to more practical constructions. However, such schemes eventually requires re-generation of key pairs that introduces extreme computation and transmission overhead to the signers. There are recent constructions that shift the re-generation and supply of one-time public keys into the distributed servers to alleviate the burden of signers. Despite their merits, these schemes require non-colluding servers (e.g., 2 out of 5 servers remain honest) to interactively compute and distribute the public keys to the verifier (without interacting with the signer). Moreover, although highly efficient, they need still symmetric-key based operations (e.g., PRF) linear to the number of servers at the signer side.

The signatures n distributed settings require signers and/or verifiers to interact in multiple rounds to generate a signature with special properties. For example, in blockchains, multi-signatures permit a set of signer to sign the same document jointly. However, they require signers to generate, exchange and verify various public nonces and commitments, and therefore can be extremely costly (if not infeasible) for embedded IoT devices. There are other distributed signatures with advanced features like group signatures and ring signatures that can be even costlier but with more advanced functionalities than multi-signatures. Similar performance hurdles are also valid for other specialized signatures with trusted entities involved in various degrees.

Thus, there is a significant need for cryptographic schemes that offer a near-optimal signing efficiency (e.g., without any expensive commitment and public nonce generations and transmissions), while also achieving non-repudiation, public verifiability and advanced features (e.g., forward-security, aggregation, multi-signature, sanitation, post-quantum security).

SUMMARY

The present disclosure provides a description of a new series of lightweight signature schemes that achieves advanced features (e.g., forward-security, aggregation, multi-signature, post-quantum security) with a low signing cost by strategically harnessing secure hardware support to enable verification and interactions. In the vast majority of the signature schemes; public commitments and keys not only play a major role but also constitutes a significant portion of the cost for resource-limited signers or other participants. Our unique approach is to let secure hardware strategically generate this public nonce, keys, and commitments on behalf of the signer with no interaction for single-signer settings, and minimum communication for multi-signers. We refer to such a secure hardware assisted architecture as PUblic nonce-Commitment-Key Oracle (PUCKO), which is a public key supplier. This approach permits the construction of optimally efficient signatures in a vast array of digital signature schemes and protocols. We call our overall framework as HArdware Supported Optimal Signatures (HASOS). Implementations of the present disclosure captures public key, commitment/nonce generations in form of one-time public keys or ephemeral values of any form (e.g., elliptic curves, lattices, hash-based, isogeny-based, pairing and others).

In accordance with an aspect of the disclosure, there is described a method for generating a cryptographic, signature in a heterogeneous system. The method includes generating a hash at a signer that is communicated as a signature, the signer being a resource-limited device; receiving the signature at a verifier; requesting, by the verifier, a public key from a public key supplier that includes a trusted hardware environment; and providing, by the public key supplier, the public key to the verifier. The trusted hardware environment of the public key supplier provides standard cryptographic hash functions, and generates a public nonce, the public key, and commitments on behalf of the signer to reduce the computational requirements at the signer.

In accordance with another aspect of the disclosure a system for generating a cryptographic signature in a heterogeneous computational environment is disclosed. The system includes a signer that generates a hash that is communicated as a signature, the signer being a resource-limited device; a public key supplier that executes on secure hardware having a trusted hardware environment that provides standard cryptographic hash functions; and a verifier that receives the signature and requests a public key from the public key supplier. The public key supplier generates a public nonce, the public key, and commitments on behalf of the signer to reduce the computational requirements at the signer.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Introduction

Figure 1:
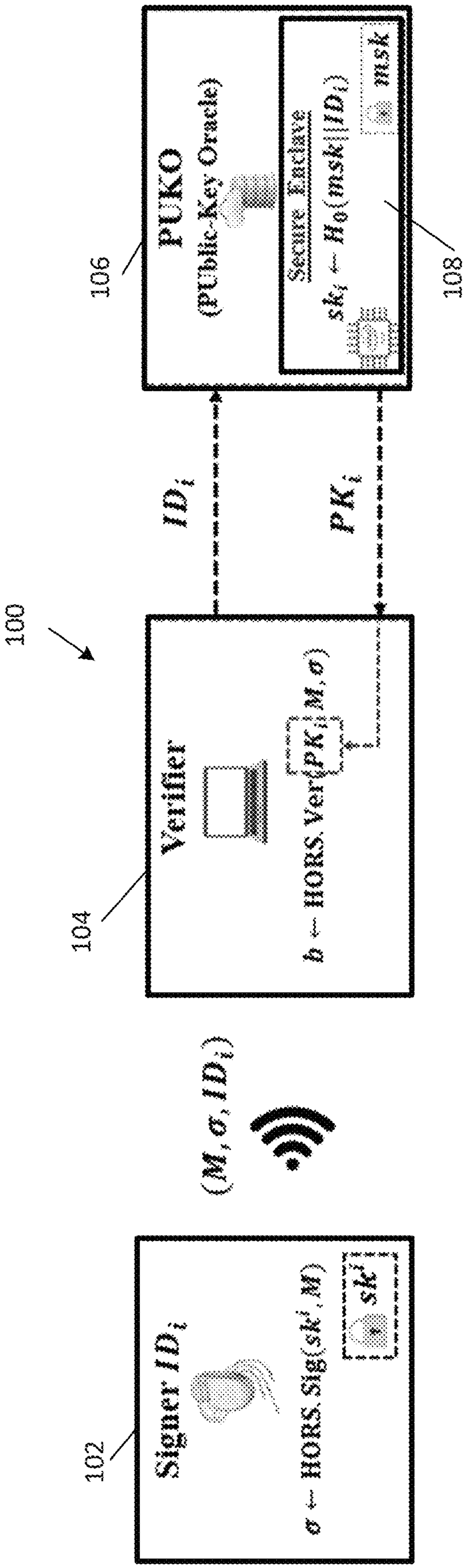
FIG. 1 illustrates an example system in accordance with the present disclosure.

Cryptographic mechanisms provide essential services such as authentication, integrity, and privacy while also offering some advanced security features (e.g., forward-security, post-quantum security). Therefore, they form the basis of cyber-security in IoTs. Aspects of the present disclosure address improvements to cryptographic mechanisms for heterogeneous IoTs and offer at least the following, non-limiting, properties.

Public verifiability and non-repudiation: These properties allow any entity to verify the trustworthiness of sensitive information (e.g., data, meta-data, logs) without learning their corresponding secret keys. They are important for forensics and legal dispute resolution (e.g., financial, health care), in which the logs are investigated without violating the user's privacy and integrity. These authentication and integrity properties are usually provided by digital signatures.

High Efficiency: Heterogeneous IoT devices (e.g., embedded medical sensors) are resource-limited (e.g., battery, CPU), yet expected to operate long durations without a replacement. Thus, cryptographic protection mechanisms should respect the resource limitations of IoT and wireless systems. The energy consumption, signing speed, number of signatures that can be generated, signature size, key and code sizes are essential performance metrics.

The computational overhead introduced by the signature generation is a critical metric that dictates the energy consumption and signing speed. The efficiency of signature generation depends on the complexity of operations performed by the signing algorithm. The majority of this overhead stems from expensive algebraic operations to produce commitments and public nonces, which often involves modular exponentiations, scalar multiplications and other similar computations (e.g., lattice-based operations). Minimizing these expensive operations can greatly increase the operation time of IoT devices and offer higher signature generation speeds, which are useful for resource-limited and delay-aware IoT applications.

The size of signature impacts the communication overhead and energy-consumption. Hence, an ideal digital signature should have a small signature size (e.g., small and minimum number of public nonce, ephemeral keys).

IoT devices have limited memory, and therefore the size of private key and expansion of cryptographic operations should be low. Similarly, the size of the code to execute cryptographic operations should be small. This can be achieved by performing simple operations and cryptographic functions.

Efficiency in Distributed Signature Settings: There are various digital signatures that requires signers and/or verifiers to interact to produce a desired outcome. Some examples include but are not limited to multi-signatures, group signatures, ring signatures and others. These schemes require entities to generate, exchange and verify various public nonces and commitments, and therefore can be extremely costly (if not infeasible) for embedded IoT devices.

Miscellaneous Advanced Properties: There are specialized digital signature schemes that offer various advanced security features. The cost of these digital signatures (both in single-signer and distributed setting) are usually much higher than their traditional counterpart due to the extra operations involved to attain the special properties.

Post-Quantum Security: Cryptosystems based on conventional hard problems (e.g., elliptic curve discrete logarithm problem (e.g., ECDSA) will be broken with the arrival of quantum computers (see Shor's algorithm). Therefore, IoT systems should consider post-quantum security to ensure long-term trustworthiness. NIST has started rounds of standardizations for post-quantum cryptography. However, the most efficient quantum-safe signature schemes currently in the NIST competition (e.g., Dilithium) are very costly for low-end IoT devices.

Compromise-resiliency: The attackers often target wireless devices to extract valuable information by breaching their system via malware infiltration or physical means. Hence, the data protection technique should offer compromise-resiliency features such as forward-security, wherein the cryptographic protection prior to attack remains valid even if the current key is exposed. Similarly, the breach of a central server should not expose all relevant users in the system.

Aggregation and holistic Integrity: The cryptographic storage and transmission overhead can be substantial due to the high volume of sensitive data and logs generated by IoT devices. The authentication tag (signature) aggregation can compress the signatures thereby mitigating this overhead. It can also not only guarantee the integrity of individual logs, but the entire log trail to prevent re-ordering and selective deletion.

Other Special Properties: There are signature schemes that can lift the burden of certificates (e.g., identity-based, certificateless) and enable update of signed message. These signatures usually rely on a trusted party with a carrying degree of trust assumption to offer these features.

Definitions

Herein, || and |x| denote concatenation and the bit length of variable x, respectively. x$\mathcal{S}$ means variable x is randomly selected from the finite set $\mathcal{S}$ using a uniform distribution. $|\mathcal{S}|$ denotes the cardinality of set $\mathcal{S}$.. {0,1}* denotes the set of binary strings of any finite length.

$$\{q_i\}_{i=0}^{n-1}$$

denotes the set of items ($q_1$, $q_2$, . . . , $q_n$). The set of items $q_i$ for i=0, . . . , n−1 is denoted by $$\{q_i\}_{i=0}^{n-1}.$$

log x denotes $\log_2 x$. $H_1$: $\{0,1\}^* \rightarrow \{0,1\}^\kappa$, $i \in \{1,2,3\}$ are distinct Full Domain Hash Functions where κ is the security parameter.

Definition 1—A hardware-assisted multiple-user multiple-time signature scheme SGN is defined as a tuple of three algorithms (Kg, Sig, PkConst, Ver):

1. (msk, I)←SGN.Kg($1^\kappa$,$\overrightarrow{ID}$,J) The key generation algorithm takes the security parameter $1^\kappa$ and the signers' identifier vector. It return the master key and the system-wide parameters.

2. $\sigma_j^i \leftarrow SGN \cdot Sig(sk^i, M)$

The signature generation algorithm SGN. Sig takes the private key $$sk_j^i$$

and a message M to be signed as input. The private key $$sk_j^i$$

is referred to the private key of the signer $ID_i$ in the round j. If the current counter exceeds the maximum number of signing times, it returns ⊥ (i.e., None).

Otherwise, it returns the signature $$\sigma^i_j$$

on the message M as output. Then, it updates the secret key $$sk^i_j \leftarrow sk^i_{j+1}$$

and the current counter j←j+1.

$$3.\ PK^i_j \leftarrow SGN \cdot PKConst(ID_i, j)$$

The public key constructor algorithm SGN.PKConst takes the signer identifier $ID_i$ and the current counter j as input. It returns the corresponding public key through a computation that incur the master key msk. The hardware assistant, whom we assumed a secure-hardware, acquire the master key msk from the key generation algorithm process.

$$4.\ b \leftarrow SGN \cdot Ver(PK^i_j, M, \sigma^i_j)$$

The signature verification algorithm takes $$PK^i_j,$$

a message M and its corresponding signature $$\sigma^i_j$$

as input. It returns a bit b, with b=1 meaning valid, and b=0 otherwise.

Definition 2—Schnorr signature scheme is a tuple of three algorithms Schnorr=(Kg, Sig, Ver) defined in Algorithm 1, below.

Algorithm 1 Schnorr Signature Scheme $(y, Y, I) \leftarrow$ Schnorr.Kg($1^\kappa$) :

1: Generate large primes q and p > q such that g|(p − 1)
2: Select a generator α of the subgroup G of order q in
3: I ← (p, q, α) represents the system-wide parameter
4: Generate the private key: $y \xleftarrow{\$} \mathbb{Z}_q^*$
5: Compute the public key: $Y \leftarrow \alpha^y \bmod p$
6: return (y, Y, I)

σ ← Schnorr.Sig(y, M)

1: $R \leftarrow \alpha^T \bmod p$
2: $e \leftarrow H_0(M||R)$
3: $s \leftarrow (r - e \cdot y) \bmod q$, where $r \xleftarrow{\$} \mathbb{Z}_q^*$
4: σ ← (s, e)
5: return σ b ← Schnorr.Ver(Y, M, σ)

1: Recall that σ ← (s, e)
2: $R' \leftarrow Y^e \alpha^s \bmod p$
3: if e = H (M||R') then return b = 1
4: else return b = 0

Definition 3 HORS signature scheme consists of three algorithms HORS=(Kg, Sig, Ver) defined in Algorithm 2, below.

Algorithm 2 Hash to Obtain Random Subset Scheme (HORS)

(sk, PK, I) ← HORS.Kg($1^\kappa$)

1: Generate the system-wide parameters I ← (l, k, t)
2: Generate t random l-bit strings $\{s_i\}_{i=1}^*: s_i \xleftarrow{\$} \{0, 1\}^l, \forall i \in [1, t]$
3. Let $v_i \leftarrow f(s_i)$, ∀i [1, t]
4. return a private/public key pair ($sk \leftarrow \{s_i\}_{i=1}^t$, $PK \leftarrow \{v_i\}_{i=1}^t$) land the system-wide parameters I ← (l, k, t)

σ ← HORS.Sig(sk, M)

1: $h \leftarrow H_0(M)$
2: Split h into k substrings $\{h_j\}_{j=1}^k$ such that $|h_j| = \log t$
3. Interpret each $h_j$ as an integer $i_j$, ∀j ∈ {1, 2, . . . , k}
4: return $\sigma \leftarrow \{s_{i_j}\}_{j=1}^k$ b ← HORS.Ver(PK, M, σ)

1: Recall that $\sigma \leftarrow \{s_i'\}_{i=1}^k$
2: $h \leftarrow H_0(M)$
> Split h into k substrings $\{h_j\}_{j=1}^k$, where $|h_j| = \log t$, ∀j ∈ {1, 2, . . . , k}
4: Interpret each $h_j$ as an integer $i_j$ ∀j ∈ {1, 2, . . . , k}
5. If $H_0(s'_j) = v_j$, ∀j ∈ {1, 2, . . . , k} then return b = 1 else return b = 0

Overview, System Model and Example Implementations

The present disclosure provides a description of a new series of lightweight signature schemes that achieves advanced features (e.g., forward-security, aggregation, multi-signature, post-quantum security) with a low signing cost by strategically harnessing secure hardware support to enable verification and interactions. In the vast majority of the signature schemes, public commitments and keys not only play a major role but also constitutes a significant portion of the cost for resource-limited signers or other participants. Our unique approach is to let secure hardware strategically generate this public nonce, keys, and commitments on behalf of the signer with no interaction for single-signer settings, and minimum communication for multi-signers. We refer to such a secure hardware assisted architecture as PUblic nonce-Commitment-Key Oracle (PUCKO), which is a public key supplier. This approach permits the construction of optimally efficient signatures in a vast array of digital signature schemes and protocols. We call our overall framework as HArdware Supported Optimal Signatures (HASOS). Implementations of the present disclosure captures public key, commitment/nonce generations in form of one-time public keys or ephemeral values of any form (e.g., elliptic curves, lattices, hash-based, isogeny-based, pairing and others).

HASOS distinguishes itself from other secure hardware-supported public key cryptography approaches (e.g., Intel EPID with SGX, BLS-TPM, IRON for functional encryption) with PUCKO that minimizes the overhead of resource-limited signers. Specifically, In HASOS, we split signature generation into two phases, wherein the signer carries out only lightweight cryptographic operations without expensive computations (e.g., commitment and public nonce/key generation), while PUCKO assumes the heavy computation and transmission of such expensive steps. We demonstrate specific instantiations of HASOS by highlighting modifications on the base signature schemes to enable such a splitting strategy. Our instantiations include one-time public keys for hash-based and DLP/ECDLP based signatures with advanced features. Our approach also offers significant benefits in distributed signatures such as multi-signatures and many other primitives. Finally, HASOS interplays well with signatures harboring trusted entities such as identity-based, certificateless and sanitizable signatures, wherein the secure hardware not only acts as PUCKO but also assumes the role of trusted entity simultaneously. In many cases, elevating the efficiency of a signature scheme with HASOS requires little modification, and therefore preserves the security and efficiency of the algorithm. Herein, we implemented some of our schemes with Intel SGX as secure hardware. However, implementations of the present disclosure are generic to any secure hardware that offers a trusted execution environment supporting necessary cryptographic operations.

The proposed framework and system model of the present disclosure improves upon convention techniques in at least the following non-limiting aspects:

1. Practically Unbounded Signing and Multi-User Capabilities: (i) HASOS can elevate any one-time signature into a practically unbounded version by supplying corresponding public keys via PUCKO. We elaborate the performance benefit of this approach with respect to computational, size and security aspects in the following items. (ii) In some HASOS variants, the PUCKO provide corresponding public key, nonce and commitment of any valid signer for any signature from the master key. Hence, can scale to the massive-size IoT applications harboring multi-million devices with only a 0(1) storage and computation efficiency.
2. Near-Optimal Signer Computational Efficiency: HASOS one-time signature instantiations are as efficient as their base scheme yet can compute practically unbounded number of signatures. For example, in the signature generation, our forward-secure scheme of the hash-based instantiation HASOS-HF have relatively the same number of CPU cycles than its basic scheme HASOS-HB with a fraction of 0.98. Yet, despite the low difference in speed, the former offer forward security unlike the latter. This was done by evolving the private key using a hash chain. Moreover, the signature generation of HASOS-HF is 17× faster than the state of the art post-quantum candidate Dilithium and 876× faster than XMSS-MT in terms of CPU cycles. Moreover, HASOS can also minimize expensive commitment and public nonce generations in distributed settings as elaborated below. For the EC-based instantiation, offer the fastest signature generation with 89× faster than ECDSA, 4.1× faster than SchnorrQ and 3.4× faster than ESEM. We should note that HASOS-ECC is aggregated signature with L=5 messages whereas the others are are not.
3. Near-Optimal Signature Size: The signature size in one-time HASOS instantiations are identical (or even smaller) to that of their base scheme. The signers do not require to transmit public nonce or keys, and only broadcast optimal-size signatures. For example, the signature size of HASOS-HF is 9.3× smaller than XMSS-MT and 68.6× smaller than SPHINCS+. This is highly important as the signer will get benefit of both fast signing and ultra-small signature size. Hence, HASOS realize the main criteria that the resource-limited devices would desire to have.
4. Reduced Round Complexity and High-Efficiency in Distributed and Trusted Settings: HASOS substantially enhances distributed signatures by permitting PUCKO to generate and distribute public nonces, thereby reducing the number of rounds and computations done by the signers. For example, HASOS yields a 2-Round (optimal) multi-signatures without costly public nonce generations at the signer. The performance of various other signatures in such settings can be improved as described below.
5. Fully Practical Post-Quantum Security with Advanced Features: Some of hash-based HASOS instantiations are forward-secure post-quantum secure with optimal efficiency. For example, instantiation HASOS-HF is 876× magnitude faster signing, 9.3×times smaller signature size compared to its most efficient counterpart XMSS with forward-security. Lattice-based HASOS instantiation can outperform the fastest lattice-based forward-secure signature ANT without requiring non-colluding servers (with partial aggregation capabilities on top). All of the advantages of HASOS in distributed and special signature settings broadly apply to their post-quantum secure variants. Finally, HASOS ECC variants offer aggregation and forward-security highly efficiently.

HASOS assumes the presence of a secure hardware on a commodity machine (e.g., laptop, server) that will act as PUCKO. This is a highly plausible requirement as Trusted Execution Environments (TEE) such as Intel-SGX and Trustzone are already available on various platforms. In return, HASOS offers significant performance advantage (e.g., orders of magnitude in many cases) with various advanced properties as outlined above. Moreover, our framework does not require any special hardware on low-end embedded devices or signature verifiers, and therefore can be broadly integrated into existing IoT systems. Hence, HASOS is an ideal digital signature framework for practical deployments that need high performance, advanced functionalities and security in IoT, wireless and distributed applications.

System Model

With reference to FIG. 1, there is illustrated an example system 100 that is designed around heterogeneous IoT systems, in which low-end devices operate for long periods and transmit signed measurements to the verifiers (e.g., a laptop). There are three example types of entities in our system model: (i) A signer 102 which may be resource-limited. The signer 102 is not expected to generate, store and/or communicate expensive commitment values and/or public keys. This enables efficient signing and meets the desired requirements of the low-end signer in the system model 100. (ii) A secure hardware environment 108 (e.g., Intel SGX, ARM TrustZone) serves as PUCKO 106. It computes and transmits commitments (e.g., one-time public key keys, ephemeral algebraic commitments) on behalf of the signer(s) to verifiers 104 (or other signers 102 in distributed signatures). Entities in the system 100 can access PUCKO 106, but not necessarily in real-time or synchronous. For example, entities (e.g., the verifier 104) can obtain commitments from PUCKO 106 before signatures are generated offline, or after in a delay-tolerant network setting. Fr instance, a cloud server harboring secure hardware (e.g., Intel SGX, not shown) onboard can supply commitments to the server without any network delay.

Hardware-Supported Optimal Signatures with Special Properties (Single-Signer)

Below is described two example instantiations of the present disclosure with hash-based and ECDLP-based techniques, respectively. We then present implementations which can be realized with a vast array of our signature constructions.

Hash-Based Instantiation

A basis for this scheme is to transform the one-time signature HORS into an unbounded time signature. In fact, it is desirable to achieve communication, computation and storage efficiency for the signer while retaining a fair overhead for the verifiers. As it is true in many IoT applications, we presume that the verifiers are resourceful (e.g., resourceful servers collect medical data from sensors for further verification). The design achieves the following non-limited features:

1. An efficient signing algorithm that uses only efficient arithmetics and few hash calls, yet avoids costly operations (i.e., Elliptic Curve (EC) scalar multiplication/addition).
2. The signer should not store precomputed tokens for efficient memory usage.
3. The signer should not communicate the public keys. As a result, his unique concern is the signature generation. Meanwhile, we rely on PUCKO to serve the verifiers with the the public keys and the nonce commitments. We design two main variants of our scheme depending on the response time required by the verifiers and on the critical usage of the signature scheme.

Figure 2:
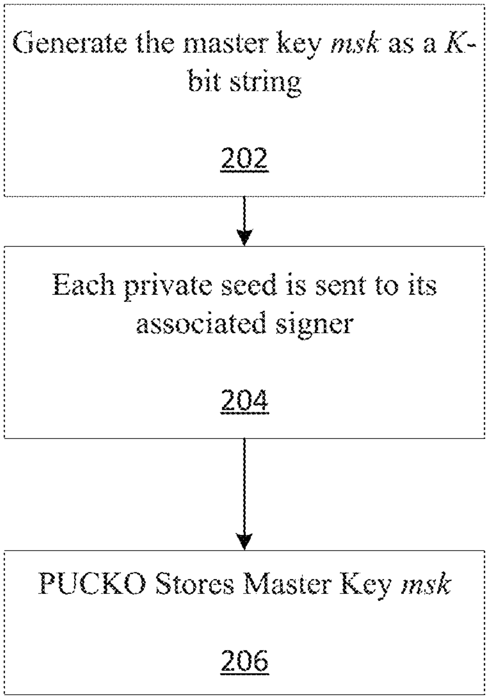
FIG. 2 illustrates an example operational flow in accordance with the present disclosure.

The Basic Scheme (HASOS-HB):

With reference to FIG. 2, we describe our basic scheme HASOS-HB for the hash-based instantiations, followed by its forward-secure version HASOS-HF. We introduce other advanced variants that attempts to optimize PUCKO efficiency in serving the public keys and nonce commitments to the verifiers. As shown in Algorithm 3, below, the Algorithm HASOS-HB.Kg(,) first generates the master key msk as a κ-bit string (at 202), and each private seed is sent to its associated signer (at 204). We should note that PUCKO stores only the master key msk in this variant (at 206). We introduced a sophisticated version which will be discussed shortly that stores pre-computed private seeds to speed up the public key construction, albeit at the cost PUCKO storage efficiency.

Figure 3:
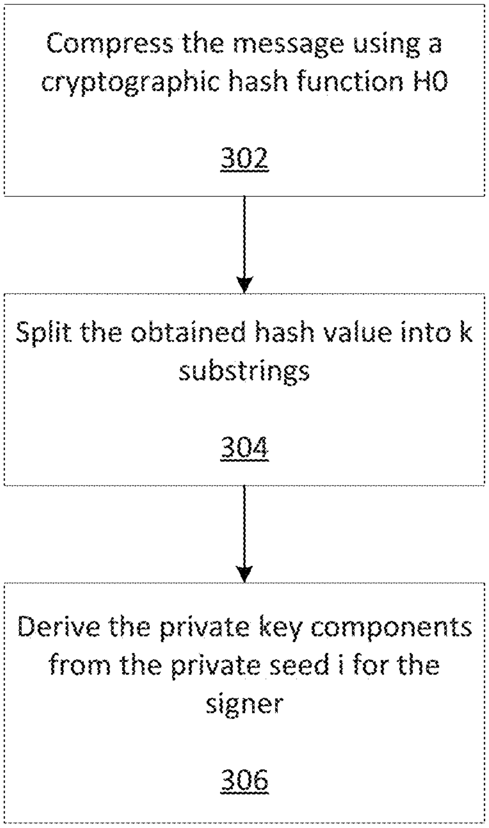
FIG. 3 illustrates another example operational flow in accordance with the present disclosure.

The signer should not communicate the public key to the verifiers when the signers are low-end devices. If we use a one-time signature scheme, this will be much more crucial as the signer will produce a new public key for each signature. We address this significant limitation by conceiving the new entity PUCKO which will be responsible of serving the verifiers with the public keys on demand. As a result, the Algorithm HASOS-HB.Sig(.) is extremely efficient and non-interactive. HASOS-HB.Sig(.) was inspired by the HORS scheme unless we have made adjustments to meet the desired requirements that such IoT devices imposed. With reference to FIG. 3, at 302, we compress the message using a cryptographic hash function $H_0$. Then, at 304, we split the obtained hash value into k substrings $$\{h_i\}_{i=1}^{N}$$

where each subset is of length log t. We alter the key generation of scheme to deterministically compute the private key rather than randomly generate one. As illustrated at 306, in algorithm HASOS-HB. Sig(.), the private key components $$\{s_i\}_{i=1}^{T}$$

are derived from the private seed $\gamma_i$ for the signer $ID_i$. Specifically, we are using a hash evaluation of the private seed concatenated with the component index j ($s_j \leftarrow H_1(\gamma_1 \| j)$). However, we do not compute all of the components of the private key $\gamma_i$. Instead, we only compute the k elements that make up the signature. This will remarkably helps in shifting the public key generation burden to PUCKO since the private seed/key are deterministically derived from the master key.

As for the signature verification in algorithm HASOS-HB.Ver, we redo the same process as in HORS scheme. The verifier will get the public key from though using a call to the function HASOS-HB.PKConst(.). This latter will let the verifier to interact with PUCKO to get the public keys. Note that the verifiers can initiate an interaction with PUCKO at any time (e.g., before receiving the signature from the signer).

The verifier can initiate a communication with PUCKO prior to the signature verification process and request a batch of public keys. This will enhance the signature verification runtime and decrease the bandwidth overhead between the verifier and PUCKO. As we assumed that the verifier is resourceful device, we can store as many public keys as we want (e.g., $2^{10}$).

Algorithm 3 HArdware Supported Optimal Signature Hash-Based Scheme (HASOS-HB)

(msk, $\vec{\gamma}$, I) ← HASOS-HB.kg($1^\kappa$, $\vec{ID}$), where $\vec{ID}$ = ($ID_1$, $ID_2$, . . . , $ID_N$):

1: Set I ← (l, k, t), as the system parameters

2: $msk \xleftarrow{\$} \{0, 1\}^\kappa$

3: for i in $\vec{ID}$ do
4: $\gamma_i$ ← $PRF_0$(msk, $ID_i$)
5: $\vec{\gamma}$ ← ($\gamma_1$, $\gamma_2$, . . . , $\gamma_N$)
6: Send the msk to PUCKO
7: Send the $\vec{\gamma}$ seeds to the N signers
8: return (msk, $\vec{\gamma}$, 1)

σ ← HASOS-HB.Sig($\gamma_i$, M): Given $\gamma_i$ compute the signature as follows:

1: h ← $H_0$(M)
2: Split h into k substrings $(h_i)_{i\in[1,k]}$ such that $|h_i| = \log_2(t)$, ∀i ∈ [1, k]
3: Interpret $h_i$ as an integer $x_i$ ∀i ∈ [1, k]
4: for $i_1$ = 1, . . . , k do
5: $s_{i_1}$ ← $H_1(\gamma_i \| x_{i_1})$
6: $\sigma^i$ ← ($s_1$, s2 , . . . , $s_k$, $ID_i$)
7: return $\sigma_i$ $PK_i$ + HASOS-HB.PKConst($ID_i$):

1: $\gamma_i$ ← $PRF_0$(msk, $ID_i$)
2: for c = 1, . . . , t do
3: $s_c$ ← $H_1(\gamma_i \| c)$
4: $v_c$ ← $H_0(s_c)$
5: $PK_i$ ← ($v_1$, $v_2$, . . . , $v_t$)
6: return $PK^i$ b ←HASOB-HB.Ver(M, $\sigma_i$)):

1: Recall that $\sigma_i$ ← ($s_1$, $s_2$, . . . , $s_k$, $ID_i$)
2: $PK_i$ ← HASOS.PKConst($ID_i$)
3: h ← $H_0$(M)
4: Split h into k substrings $(h_i)_{i\in[1,k]}$ such that $|h_i| = \log_2(t)$, ∀i ∈ l1, k]
5: Interpret $h_i$ as an integer $x_i$, ∀i ∈ [1, k]
6: If $H_0(s_j) = v_{x_j}$, ∀j ∈ [1, k] then return b = 1
7: else return b = 0.

The Forward Secure Scheme (HASOS-HF):

Forward-secure signatures (FSSs) are developed to enhance the resiliency of signatures regarding key exposure. Indeed, the adversary cannot forge the past private signatures once he compromise the present one because the private key is evolving with each signature generation.

Below is described an example post-quantum forward-secure multiple-time signature variant in the Algorithm 4 called Hardware-Assistant Supported Optimal Signature Forward-Secure (HASOS-HF). It achieves forward security by using a hash chain on the signer's private seed and increment a counter during each signature generation. In the Algorithm 4, the key generation algorithm HASOS-HF.Kg (.) is similar to the basic variant HASOS-HB unless the obtained private seeds represents the initial ones. For the signature generation, the signer compute the signature as in HASOS-HB and put the current counter and the signer identifier in the signature (Step 6 in HASOS-HF.Sig). The only overhead that was added due to the forward security property is merely the update of the private seed $$\gamma_i^j$$

using hash function call (Step 7 in HASOS-HF.Sig). As a result, the signer have full advantage over its counterparts due to the fast signature generation with few hash evaluations. Indeed, the signer's primary concern is to produce the signature, whereas the verifier will seek the public key from PUCKO by providing the signer's identifier $ID_i$ and the counter j using HASOS-HF.PKConst algorithm. As for the signature verification, it remained the same as HASOS-HB.

Algorithm 4 HArdware Supported Optimal Signature Hash-based Forward-secure Scheme (HASOS-HF)

(msk, $\vec{\gamma}_i$, *I*) ← *HASOS-HF.Kg*($1^\kappa$, $\vec{ID}$, J), where $\vec{ID}$ = ($ID_1$, $ID_2$, . . . , $ID_N$) and J represents the maximum number of signatures that the signer can sign:

1: Set I ← (l, k, t), as the system parameters

2: $msk \xleftarrow{\$} \{0, 1\}^\kappa$ 3. for i in $\vec{ID}$ do
4: $\gamma_1{}^i$ ← $PRF_0$(msk, $ID_i$)
5: $\vec{\gamma}_1$← ($\gamma 1^1$, $\gamma_1{}^2$, . . . , $\gamma_1{}^N$)
6: Send the msk to PUCKO -continued

Algorithm 4 HArdware Supported Optimal Signature Hash-based Forward-secure Scheme (HASOS-HF)

7: Send the initial private seeds $\vec{\gamma}_1$ *to the N signers*
8: return (msk, $\vec{\gamma}_1$, $I$)
$\sigma \leftarrow$ HASOS-HF.Sig($\gamma_j^i$, $M_j$): Given the seed $\gamma_j^i$, compute the signature as follows:

1: $h \leftarrow H_0(M_j)$
2: Split h into k substrings $(h_i)_{i\in[1,k]}$ such that $|h_i| = \log_2(t)$, $\forall i \in [1, k]$
3: Interpret $h_i$ as an integer $x_i$, $\forall i \in [1, k]$
4: for $i_1 = 1, \ldots, k$ do
5: $\quad s_{ij} \leftarrow H_1(\gamma_j^i \| x_{i_1})$
6: $\sigma_j^i \leftarrow (s_1, s_2, \ldots, s_k, j, ID_i)$
7: Update $\gamma_j^i$ as $\gamma_{j+1}^i \leftarrow H_2(\gamma_j^i)$
8: if j > J then return $\perp$ (i.e., the limit on the number of signatures is exceeded)
9: else return of $\sigma_j^i$
($PK_j^i$) $\leftarrow$ HASOS-HF.PKConst ($ID_i$, j):

1: $\gamma_1^i \leftarrow PRF_0(msk, ID_i)$
2: for c = 2, . . . , j do
3: $\quad \gamma_c^i \leftarrow H_2(\gamma_{c-1}^i)$
4: for c = 1, . . . , t do
5: $\quad s_c \leftarrow H_1(\gamma_j^i \| c)$
6: $\quad v_c \leftarrow H_0(s_c)$
7: $PK_j^i \leftarrow (v_1, v_2, \ldots, v_t)$
8: return $PK_j^i$
b $\leftarrow$ HASOS-HF.Ver($M_j$, $\sigma_j^i$)): If j > J then HASOS.Ver return 0 and aborts. Otherwise, continue as following:

1: Recall that $\sigma_j^i \leftarrow (s_j, j, ID_i)$
2: $PK_j^i \leftarrow$ HASOS-HF.PKConst($ID_i$, j))
3: $h \leftarrow H_0(M_j)$
4: Split h into k substrings $(h_i)_{i\in[1,k]}$ such that $|h_i| = \log_2(t)$, $\forall i \in [1, k]$
5: Interpret $h_i$ as an integer $x_i$, $\forall i \in [1, k]$
6: if $H_0(s_j) = v_{x_j}$, $\forall j \in [1, k]$ then return b = 1
7: else return b = 0

The Pre-computed Scheme (HASOS-HP):

This variant was designed for critical applications where latency cannot be tolerated for the signature verification. PUCKO store 0 ($\sqrt{J}$) signer's private seeds so that he can compute the requested public key from the nearest stored seed. This will result in 0($\sqrt{J}$) computation. All the algorithms in HASOS-HP are identical to the forward-secure variant HASOS-HF except HASOS-HP.PKConst and HASOS-HP.Kg. The alteration of the latter algorithms is illustrated in Algorithm 5, below. In fact, PUCKO will store pre-computed private seeds to optimize the response-time of the verifier's request. This comes at the cost of having a linear storage (to the numbet of signers) of the private seeds. We assume that PUCKO is computational and storage resourceful. As a result, the request delay to get the public key for the verifier is negligible while the signer still enjoys fast signing through few hash calls and small storage overhead by storing only the private seed $$\gamma_j^i.$$

As illustrated in Algorithm 5, we compute in advance the pre-computed private seeds in the algorithm HASOS-HP.Kg (.) (Step 6-8) and store them on PUCKO along with the master key msk (Step 9-10). To construct the public key from the pre-computed private seeds, in algorithm HASOS-HP.PKConst, PUCKO determines the nearest stored seed from the requested public key (Step 1).

Algorithm 5 HArdware Supported Optimal Signature Hash-based Precomputed-seeds Scheme (HASOS-HP)

(msk, $\vec{\gamma}_i$, $I$) $\leftarrow$ *HASOS-BP.Kg*($1^\kappa$, $\overrightarrow{ID}$, J), where $\overrightarrow{ID} = (ID_1, ID_2, \ldots, ID_N)$ and J represents the maximum number of signatures that the signer can sign:

1: Set I $\leftarrow$ (l, k, t), as the system parameters

2: $msk \xleftarrow{\$} \{0, 1\}^\kappa$

3: for i in $\overrightarrow{ID}$ do
4: $\quad \gamma_1^i \leftarrow PRF_0(msk, ID_i)$
5: $\vec{\gamma}_1 \leftarrow (\gamma 1^1, \gamma_1^2, \ldots, \gamma_1^N)$
6: for j = 1, 2, . . . , $\sqrt{J} - 1$ do
7. $\quad \gamma_{j\cdot\sqrt{J}+1}^i \leftarrow H_2^{\sqrt{J}}(\gamma_{(j-1)\cdot\sqrt{J}+1}^i)$
8: $\quad$ The pre-computed private seeds for the signer $ID_i$ are: $(\gamma_1^i, \gamma_{\sqrt{J}+1}^i, \gamma_{2\cdot\sqrt{J}+1}^i, \ldots, \gamma_{(\sqrt{J}-1)\cdot\sqrt{J}+1}^i)$
9: Send the msk and the pre-computed private seeds to PUCKO
10: Send the initial private seeds $\vec{\gamma}_1$ *to the N signers*
11: return (msk, $\vec{\gamma}_i$, $I$)

-continued

Algorithm 5 HArdware Supported Optimal Signature Hash-based Precomputed-seeds Scheme (HASOS-HP)

$(PK_j^i) \leftarrow$ HASOS-HP.PKConst($ID_i$, j):

1: $j_1 \leftarrow \left\lfloor \frac{j-1}{\sqrt{j}} \right\rfloor + 1$
2: $j_2 \leftarrow (j-1) \bmod \sqrt{J} + 1$
3: Load the pre-compute private seed $\gamma_{j_1}^i$
4: $\gamma_j^i \leftarrow H_2^{j2}(\gamma_{j_1}^i)$
5: for c = 1, . . . , t do
6: $s_c \leftarrow H_1(\gamma_j^i \| c)$
7: $v_c \leftarrow H_0(s_c)$
8: $PK_j^i \leftarrow (v_1, v_2, \ldots, v_t)$
9: return $PK_j^i$ Many Other Potential Hash-based Instantiations: Many other hash-based one-time signatures (e.g., HORSIC, HORSIC+, Merkle-Winternitz) can be implemented within our proposed system. As we have shown that the one-time signature HORS works with our framework. The same process goes with other OTS signature schemes. However, the trade-offs between the private/public keys and the signature sizes remains the unique limitation. For instance, HORSIC offer slightly shorter signature size and public key size than HORS at the expense of the signature generation/verification. We aim in our framework to optimize our signature generation algorithm since the signers are resource-limited devices. Hence, a good trade-off between the signature/private key size and number of cycles for the signature generation/verification remains our top priority. As a result, one can pick the hash-based OTS signature scheme that offer the best trade-off between these parameters. On the other side, all these variants will receive an equal benefit from our framework.

One can also create a two-party hash-based signature, in which a component of hash-based signature is computed by the signer, and another is by PUCKO, effectively transforming some of the standard hash-based signatures into two party setting. For example, in XMSS, the signer might compute and transmit only one component of the signature, while other parts of the signature (i.e., the path on the signature tree) can be generated and send by PUCKO.

DLP/ECDLP Instantiation

Classic DLP-based signatures (e.g., ECDA, Schnorr) can avoid costly operations from signature generation by pre-computing the commitment $R=\alpha^r \bmod p$ for a random variable $$r \xleftarrow{\$} \mathbb{Z}_p^*$$

during the key generation. The signer stores (r, R) and then use them to compute signatures during online phase, without any expensive operation. However, this entails linear storage at the signer's side (i.e., one token per message). It is highly desirable to construct a multiple-time signature scheme with constant-signer storage while avoiding expensive operations. However, this is a challenging problem due to the nature of the aforementioned schemes. That is, the token R is directly used during the signature generation and as a result its storage cannot be offloaded to the verifier's side easily. Therefore, the signer is forced to either store or compute a token for each message.

Storage of the ephemeral keys can be moved to the verifier's side without compromising the security model and the verifiability of the signatures. For instance, the new signature scheme called Efficient and Tiny Authentication (ETA) does not require any expensive operation at the signer side: This optimization was at the cost of the verifier assuming that this latter is a resourceful device (e.g., gateways, laptops, high-end sensors) while the signer is a resource-limited device (e.g., low-end sensors, smart cards, drones). In fact, the ephemeral keys ($r_j$, $R_j$) are derived deterministically using few hash calls and without any expensive operation.

We designed this instantiation in Algorithm 6, below, based on ETA signature scheme. It is a non-forward secure aggregated signature scheme unlike the previous hash-based instantiations. This is the limitation for the aggregated signature schemes with EC-based signature schemes because the verifier should have nonce commitments from PUCKO along with the public key. The nonce commitments are dependent to a unique message. As a result, this will result to a linear overhead to the number of the aggregated signatures. This will incur a large bandwidth overhead that PUCKO will communicate with the verifiers. In order to eliminate such overhead, we propose a non-forward secure signature scheme where the nonce commitment is constant through the signatures generation. Hence, the nonce-commitments remains constant in size as we are increasing in the size of the aggregated messages.

As illustrated in Algorithm 6, in the key generation algorithm, we randomly generate the master key msk in Step 4 as well as the system-wide parameters (Step 1-3). The signers' private key are derived from the master key using a single cryptography hash evaluation (Step 5-7). The master key msk is sent to PUCKO while each computed private key from $$\vec{y} = \{y_i\}_{i=1}^N$$

is sent to the corresponding signer $ID_i$. The signature generation algorithm HASOS-ECC.Sig takes as input the signer private key $\gamma_i$ and a set of messages of size $\vec{M}=(M_1,$ $M_2, \ldots, M_L$). The output of consists of the aggregated signature $\sigma_i$ on the messages' batch $\vec{M}$. We should note that the signature generation algorithm is deterministic where the nonce commitments $$\{x_i\}_{i=1}^{L}$$

are derived from the signer's private key $\gamma_i$ using a hash chain with the hash function $H_0$ (Step 3, 6). We then performed a loop that iterates through the set of messages $\vec{M}=(M_1, M_2, \ldots, M_L)$ and compute their corresponding signatures (Step 5-9). We compute the aggregated signature $s_i$ using a modular addition of the computed signatures (Step 10). As for the signature verification algorithm HASOS-ECC.Ver, it takes as input the messages' batch $\vec{M}$ and the aggregated signature $\sigma_i$. The signer's public key $Y_i$ and the nonce commitments ($R_i$, $x_1$) are requested from PUCKO in Step 2. Afterwards, the signature verification will be made as in ETA signature scheme.

We designed a basic scheme that we call HASOS-ECC-B which is the basic scheme of HASOS-ECC without aggregation property. As the limitation of linear storage overhead on PUCKO side goes away with the elimination of aggregate signature, we can add the forward security property to HASOS-ECC-B.

Algorithm 6 HArdware Supported Optimal Signature ECC Scheme (HABOS-ECC)

(msk, $\vec{y}$, I) ← HASOS-ECC. Kg($1^\kappa$, $\vec{ID}$), where $\vec{ID} = (ID_1, ID_2, \ldots, ID_N)$):

1: Generate large primes q and p > g such that g|(p − 1)
2: Select a generator α of the subgroup G of order q in
3: I ← (p, q, α) represents the system-wide parameter
4. $msk \overset{\$}{\leftarrow} \{0, 1\}^\kappa$
5: for i in $\vec{ID}$ do
6. $y_i \leftarrow PRF_0(msk, ID_i)$
7: $\vec{y} \leftarrow y_1, y_2, \ldots, y_N$)
8: Send the msk to PUCKO
9: Send the initial private keys $\vec{y}$ to the N signers
10: return (msk, $\vec{y}$, I)

$\sigma_i \leftarrow$ HASOS-ECC.Sig($y_i$ $\vec{M}$), where $\vec{M} = (M_1, M_2, \ldots, M_L)$ and L represents the batch size of themessages to be aggregated.

1: Let $\sigma_i$ be the the signature on the message M for the signer $ID_i$
2: Let $s_i$ be a component of the signature initialized to 0
3: $x_0 \leftarrow H_0(y_i)$
4: $r_0 \leftarrow H_1(y_i)$
5. for l = 1 , . . . , L do
6: $x_l \leftarrow H_0(x_0 \| l)$
7: $r_l \leftarrow H_1(r_0 \| l)$
8: $e_l \leftarrow H_2(M_l \| v_l)$
9: $s'_l \leftarrow r_l - e_l \cdot y_j^{\,i} \bmod p$
10. $s_i \leftarrow s_i + s'_l \bmod p$
11: $\sigma_i \leftarrow (s_i, ID_i, L)$
12: return $\sigma_i$ $PK_i \leftarrow$ HASOS-ECC.PKConst($ID_i$. L):

1: $y_i \leftarrow PRF_0(msk, ID_i)$
2: $Y_i \leftarrow \alpha^{yi} \bmod p$
3: $x_0 \leftarrow H_0(y_i)$
4: $r_0 \leftarrow H_1(y_i)$
5: $R_i \leftarrow 1$
6: for l = 1, . . . , L do
7: $r_l \leftarrow H_1(r0 \| l)$
8: $R_i \leftarrow R_i \cdot \alpha^{rl} \bmod p$
9: $PK_i \leftarrow (Y_i, R_i, x_0)$
10: return $PK_i$ b ← HASOS-ECC.Ver($\vec{M}$ , $\sigma_i$), where $\vec{M} = (M_1, M_2, \ldots, M_L)$.

1: $PK_i \leftarrow$ HASOS.PKConst($ID_i$, L)
2: Recall that $PK_i \leftarrow (Y_i, R_i, x_0)$ and $\sigma_i \leftarrow (s_i, ID_i, L)$
3: $e_1 \leftarrow H_2(M_1 \| x_1)$
4: $R'_i \leftarrow \alpha^{el} \bmod p$
5: for l =I, . . . , L do
6: $x_l \leftarrow H_0(x_0 \| l)$
7: $e_l \leftarrow H_2(M_l | x_l)$
8: $R'_i \leftarrow R'_i \cdot Y_i^{el} \bmod p$
9: if $(R'_i)_x = (R_i)_x$ then return b = 1
10: else return b = 0

Miscellaneous and Alternative Instantiations

HASOS can enable a vast array of instantiation relying on various signature schemes beyond at aforementioned instantiations, such as those described below.

Alternative Post-Quantum Secure Instantiations

One-time lattice-based signatures are ideal alternatives to be enhanced with HASOS. Implementations of the present disclosure enable forward-secure lightweight post-quantum signatures as in without requiring non-colluding distributed servers and additional limited aggregation capability on top (depending on the noise-level). It is also possible to enhance the efficiency of Fiat-Shamir with Abort style lattice-based schemes like Dilithium and Tachyon by separating its commitment from the message hashing as in ETA and SEMECS. However, this may require creating multiple commitments per message to be signed depending on the rejection sampling rate. We leave it as an open-problem to identify the details of such strategy, but the present disclosure is intended to cover such potential modifications and extensions.

Several other post-quantum signatures can receive benefit from HASOS. Inline with hash-based alternatives, HASOS can improve Picnic variants that only rely on symmetric-key cryptography by generating public keys via PUCKO. Isogeny-based signatures are highly currently highly expensive for signers with large signature sizes. If the commitment separation strategy in can be applied to such signatures then HASOS can substantially improve their signer efficiency. One can consider enhancing coding-based [multi-variate signatures in a similar way.

Some alternative approaches can completely offload the authentication process to the secure hardware. For example, a low-end device can simply set up a trusted channel with the secure hardware, transmit the message to be authenticated over this channel (e.g., by placing a MAC on it), and then let the hardware put a signature on its behalf. This straightforward approach does not meet the various properties that HASOS offer. In the present disclosure, the signer actively computes a part of digital signature with its corresponding private key, thereby achieving non-repudiation and public verifiability. However, the straightforward approach described here places all aspects of the authentication process to the secure hardware and therefore does not offer non-repudiation and only partial public verifiability. Moreover, the lightweight device is restricted to communicate and fully trust to the secure hardware, and cannot broadcasting its signature independently.

Hardware-Supported Optimal Signatures in Distributed Settings

We now propose various hardware-supported signatures in distributed settings with significant performance improvements over their plain versions.

Instantiations with Multi-Signatures

A multi-signature permits a set of signers to generate a joint signature on a common message. Among many other uses, they are frequently used to let multiple participants to sign the same smart-contract on blockchains jointly. Some of the most important multi-signatures rely on Schnorr signatures, which also constitutes the basis of our improved ECC one-time signatures described in ECDLP instantiations. In Schnorr-based multi-signatures, the signers communicate in multiple rounds to aggregate upon public nonces $R_i$ their commitments $t_i$ and aggregate public keys $\tilde{Y}$. There are 3-Round and 2-Round multi-signature schemes with different communication, execution time and provable security properties. MuSig variants well exemplify this genre of multi-signature, and we curious reader to for the details of such constructions. Despite their elegance, these schemes requires several exponentiations (or scalar multiplications) as well as communications.

Our Signer-Optimal Hardware Supported Multi-Signature: HASOS can substantially reduce the total overhead multi-signatures. We will showcase this capability by transforming 3-Round MuSig into HASOS setting. Many other multi-signatures can be enhanced by following similar strategies.

Inline with our previous constructions, we assume PUCKO holds a master key for all registered entities, which is possible for private and permissioned blockchain settings. In this case, the total number of communication rounds and computations by each signer can be substantially reduced by transforming all joint public commitment and public generation at the secure hardware. We exemplify this strategy by following the notation of but only providing essential steps to highlight our modifications.

The first round of 3-Round Musig requires each signer to compute an aggregate public key $\tilde{Y}$ by performing n scalar multiplications and exchanging n−1 public key from other signers. In our case, by utilizing the master key, PUCKO can compute $\tilde{Y}$ on behalf of all signers and broadcast $\tilde{Y}$ to the verifiers and each signer. The signer i also receives its individual token $a_i=H(L\|Y_i)$ from PUCKO where L' is the set of public keys used in the protocol. Hence, our approach alleviates the burden of signers by eliminating one full round of inter-signer communication and computation from MuSig.

The second round of 3-Round Musig requires each signer to compute their public nonce $R_i$ and its commitment ti, which are exchanged and verified with other signers. This permits each signer to compute joint public nonce $$R=\prod_{i=1}^{n}$$

$R_i$, i=1, . . . , n. In our case, PUCKO computes $$R=\prod_{i=1}^{n}$$

$R_i$, i=1, . . . , n from master key and provides it to the signers. Since each signer receives R from PUCKO, commitment verifications are not needed. By executing this step together with (b), our approach eliminates yet an another expensive series of operations and communications.

The last round of 3-Round Musig requires each signer to compute $s_i=r_i+H(\tilde{Y}\|R\|m)\cdot a_1\cdot y_1 \bmod q$ on message m, where $(r_i,y_1)$ are the ephemeral randomness and private key of the signer i, respectively. We keep this step intact, where each signer broadcasts its component $s_i$. The verifier can aggregate $$S=\sum_{i=1}^{n}$$

$s_i$ modq, obtaining the final signature (S, R) This signature can be easily verified as in MuSig via aggregate public key $\tilde{Y}$ akin to Schnorr signature. Note that our approach permits signers to compute their individual $s_i$ without any exponentiation (or scalar multiplication), and let verifiers to authenticate final aggregate signature like ordinary Schnorr signature.

Overall, hardware-supported multi-signature described above offers significant communication and computations saving by offloading all the public nonce generation, verification and aggregation PUCKO, while permitting signers to only compute $s_i$ without any expensive operation.

Miscellaneous Hardware-Assisted Signatures for Blockchains and Distributed Settings There are several other multi-signer signature schemes that can receive substantial benefit from our framework. Specifically, any multi-signer digital signature scheme that produces one-time nonces (e.g.; one-way commitments, ephemeral public keys, etc . . . ) will receive benefit from. Some non-limiting examples are as follows:

Enhancing Group Signatures and One-Time Ring Signatures:

In a group signature, a group of entities, each having its own private signing key, can produce signatures on behalf of the group, verifiable under a single public verification key associated to the group as a whole. The main security property is that the identity of the group member producing a particular signature not be discernible from this signature (anonymity), except to an authority possessing a special "opening" key (traceability). Other requirements are unlinkability, unforgeability; collusion resistance and others. Many group signature settings involve a trusted setup. Group signatures with SGX-support has been explored in the context of EPID. Therefore, our proposed framework can interplay with these schemes from an architectural point of view.

We propose to use secure hardware to compute public key components and one-time nonces. This differs from EPID in the sense that it permits an optimal signing efficiency. However, it also complements the benefits offered by EPID. Moreover, our framework can substantially enhance the post-quantum group signatures from generic constructions encapsulating lattices and isogenies. Also, although do not rely on a trusted setup phase, inline with our one-time signature based schemes, the signature generation of one-time Ring signatures can be improved via our framework.

Enhancing Sanitizable, Certificateless, Ephemeral Signatures and Their Extensions:

There are signature schemes with special properties, in which an authority possess a higher role in creating and ci-transforming the produced signatures. As in the case of group signatures, our proposed framework is highly compatible with these signatures, wherein the secure hardware can not only lay a role for the authority with high trust/role, but also enable the signer optimality by providing all publicly disclosable signature and public key components. Some examples are as below:

Sanitizable signatures permits a signer chosen sanitizer to modify and re-sign a message in a somewhat controlled way, that is, only editing parts (or blocks) of the message that are admissible for modification. It can possess additional properties such as unlinkability, transparency, immutability, invisibility, and unforgeability. Sanitizable signatures can be useful for many applications such as anonymizing medical files. One can see our scheme can enhance the performance of the signer as in other signature schemes by carrying over public keys and one-way commitments. Additionally, as an option, it can play the role of the sanitizer, thereby broadly transform any signature into sanitizable setting.

Identity-based and certificateless signatures mitigates the burden of transmitting and verifying certificates. In these schemes, a key generation center either directly generates or participates (with certain degree of involvement) into the issuance of not only public key but also private keys. Our framework ideal to enhance the signer efficiency of such signatures since it can both enable a trustworthy issuance of private keys, while also providing public nonces.

Another line of signature scheme is Ephemeral Signatures (ESig), which is used to prevent forks in some major consensus algorithms for blockchains. An ESig requires an ephemeral private/public key pair per signature, which prevents corruption as the miners cannot sign other messages under the same key pair. Algorand obtains its ESig from an identity-based signature (IBS), in which the master key is kept at the user and a new private/public key pair is sampled for each signature, Our framework is ideal to enhance the signer efficiency of ESig, since it boosts the efficiency of one-time signatures, and also support identity-based signatures as discussed above.

All of the above HASOS strategies for special and/or distributed signatures may apply to their post-quantum secure versions with corresponding alterations (e.g., computation of commitments with lattice-based operations as opposed to ECC-based ones).

The Proof of Concept Implementation, Performance Analysis and Comparison

We first describe our configuration and evaluation methodology, followed by the main experimental results.

Configuration and Methodology

Hardware: We valuated the performance of our schemes on a commodity desktop, which supports Intel SGX and is equipped with Intel i9-9900K @3.6 GHz, 64 GB RAM and 2 TB SSD.

Libraries: We implemented our EC instantiation HASOS-ECC on the open-source OpenSSL library. We used Intel SGX SDK v2.15.1 with C/C++ to implement PUCKO. For cryptographic operations inside the enclave, we used Intel Software Guard Extensions SSL which is an implementation of OpenSSL library for secure enclaves.

Parameter Selection: To get a security level of 128 bits, we select l=256, k=16 and t=4096 for our hash-based instantiations (i.e., HASOS-HB, HASOS-HF and HASOS-HP). For the EC instantiation, we used the NIST P-256 curve which provide 128-bits of security. The hash functions are derived from SHA-256. Specifically, $H_i$ is defined as: $H_i$: $M \rightarrow SHA_{256}(M\|i)$. The number of signers for the multiple-signer signature schemes is N=10,000. The parameter j which represents the number of rounds that the signer can generate a signature is $2^{20}$ Evaluation Metrics We implemented HASOS instantiations on the aforementioned hardware to evaluate the following:

1. At the signer's side, the number of CPU cycles for signature generation on the commodity hardware and private key size were evaluated.
2. At the verifier's side, the number of CPU cycles for signature verification on the commodity hardware and the size of public key size were evaluated.
3. At PUCKO side, the storage of the master key, the size of the master key and the pre-computed of the private seeds/keys were evaluated.
4. We take into consideration the special properties that the signature scheme offers as a criteria to compare the proposed instantiations and their counterparts. For instance, the post-quantum promise is a primary concern that we put as the first criteria. In addition, the contribution of our proposed schemes is that they offer a distributed setting where multiple signers can have private/public keys that are derived from a unique master key. This will give a gain in the storage efficiency on the server side, but also offers a remarkable advantage in the way that the trusted entity PUCKO will generate the signers' public keys from a single key msk.

Experimental Results

Table 1, below presents the experimental results of our hash-based and Elliptic Curve instantiations along with the their counterparts. As compared to the state of the art algorithms, our variants is significantly faster and memory efficient at PUCKO side.

For hash-based instantiations, we outperform all the compared algorithms for the memory efficiency of both the private key and signature sizes.

hash-based post-quantum forward-secure counterpart XMSS-MT in terms of CPU cycles. As for the signer storage, our schemes outperforms all their counterparts by storing just a private seed of 32 bytes from which the private key is derived from. As a result, HASOS-HF and HASOS-HP have a private key size 84× smaller than Dilithium, 162× faster than XMSS-MT. The key behind the fast sign in is to sign the message deterministically. As such, we do not resort to rejection sampling like Dilithium.

Signature Verification: The signature verification in HASOS variants showed high efficiency that supersedes their counterparts in terms of CPU cycles. For instance,

TABLE 1

Performance comparison of HASOS variants and its counterparts on commodity hardware

| Scheme | Signing Cycles | Private Key | Signature | Verif. Cycles | Public Key | PUCKO Comp. | PUCKO Storage |
|---|---|---|---|---|---|---|---|
| ECDSA [47] | 691,768 | 0.03 | 0.06 | 691,768 | 0.03 | — | — |
| SchnorrQ [26] | 32,016 | 0.32 | 0.06 | 60,453 | 0.03 | — | — |
| ESEM [70] | 26,170 | 0.03 | 0.04 | 95,462 | 0.03 | 25 | — |
| SPHINCS+ [15] | 112,080,752 | 0.1 | 35.66 | 10,249,926 | 0.05 | — | — |
| Dilithium-II [31] | 210,188 | 2.53 | 2.42 | 88,400 | 1.31 | — | — |
| Dilithium-III [31] | 466,609 | 4 | 3.29 | 110,524 | 1.95 | — | — |
| ANT-III [9] | 84,805 | 0.56 | 0.56 | 399,214 | 7.36 | 25 | — |
| ANT-FS-III [9] | 86,914 | 0.09 | 0.56 | 399,214 | 7.36 | 25 | — |
| XMSS-MT [43] | 10,557,864 | 5.86 | 4.85 | 3,944,441 | 0.06 | — | — |
| HASOS-HB | 11,755 | 0.03 | 0.52 | 11,813 | 131.07 | 1.4 | 0.03 |
| HASOS-HF | 12,051 | 0.03 | 0.52 | 12,426 | 131.07 | 167.85 | 0.03 |
| HASOS-HP | 11,755 | 0.03 | 0.52 | 11,755 | 131.07 | 2.16 | 100,000 |
| HASOS-ECC-B | 7,770 | 0.03 | 0.04 | 196,425 | 0.1 | 0.44 | 0.03 |
| HASOS-ECC | 23,136 | 0.03 | 0.04 | 39,259 | 0.1 | 0.61 | 0.03 |

| Scheme | Post-Quant | Rejection/Gaussian (Sampling) | Forward Security | Deterministic Signing | Multi-signer/Cert | Non-Colluding Assumption |
|---|---|---|---|---|---|---|
| ECDSA [47] | X | X | X | X | X | X |
| SchnorrQ [26] | X | X | X | ✓ | X | ✓ |
| ESEM [70] | X | X | X | ✓ | X | ✓ |
| SPHINCS+ [15] | ✓ | ✓ | X | ✓ | X | X |
| Dilithium-II [31] | ✓ | ✓ | X | X | X | X |
| Dilithium-III [31] | ✓ | X | X | X | X | X |
| ANT-III [9] | ✓ | X | X | X | X | ✓ |
| ANT-FS-III [9] | ✓ | X | ✓ | X | X | ✓ |
| XMSS-MT [43] | ✓ | X | ✓ | X | X | X |
| HASOS-HB | ✓ | X | X | ✓ | ✓ | X |
| HASOS-HF | ✓ | X | ✓ | ✓ | ✓ | X |
| HASOS-HP | ✓ | X | ✓ | ✓ | ✓ | X |
| HASOS-ECC-B | X | X | ✓ | ✓ | ✓ | X |
| HASOS-ECC | X | X | X | ✓ | ✓ | X |

In Table 1, the private/public keys and the signature sizes are in KB. PUCKO Camp is referred to the average runtime spent by PUCKO to respond to the verifiers' requests and its unit is ms. For HASOS hash-based variants, we use the parameters l=32, k=16 and l=4096 for 128-bits security. Dilithium-2 and Dilithium-3 provide similar security to our HASOS variants. For HASOS-ECC, we selected L=5 as the number of aggregated signatures. For XMSS-MT, we benchmarked the XMSSMTSHA20/2_256 variant. For SPHINCS+, we used the parameters n=16, h=66, d=22, b=6, k=33, w=16 for 128-bits security. In the Multi-Signer PKs/Cert Storage column, we consider $2^{14}$ as N (i.e., the number of signers) in the system and J is equal to $2^{20}$ (i.e., the number of times the signer can generate a signature).

Signature Generation: Our hash-based instantiations HASOS-HF and HASOS-HP schemes offer the fastest signature generation on the commodity hardware. This translates in a gain of 17× faster than the state-of-the-art post-quantum candidate Dilithium and 876× faster than their HASOS-HF is 32× faster than ANT-2 and 8× faster than Dilithium-3. However, HASOS hash-based variants were designed with a focus on providing signature efficiency generation and memory efficiency at the signer side. This came at the cost of the public key size which is equal to 131.07 KB. This limitation is recovered by the assumption that the verifiers are resourceful machines which is the case for almost all the IoT applications. We should note that PUCKO is the responsible for delivering the public keys and nonce commitments to the verifiers. Hence, the signer will communicate only the signatures while PUCKO sends the public keys to the verifiers.

PUCKO Computation: In our case, PUCKO represents the secure hardware that our schemes will rely on to store the master key msk from which the private/public keys of the signers are derived from. Hence, our system rely on a single server. As a result, we do not require the non-colluding assumption which is not the case for ANT and ESEM. Furthermore, the reliance on a single secure hardware server to provide the public keys and the nonce commitments will lower significantly the network delay. Indeed, the communication overhead for ESEM is 37 ms while the network delay for ANT is 25 ms per server. While this implementation was for the sake of proof of work, we measured the server computation for distributed signature schemes and compare it with their similar counterparts. The server computation for HASOS-ECC is 4.9× faster than ESEM. Even though offers much strong properties that ESEM (i.e., signature aggregation, forward security and post-quantum safe), the server process remained much optimized. We should stress that both compared schemes were executed on the same commodity hardware and that ESEM use Blake2b as hash function where we used SHA-256. In fact, Blake2b is much faster than SHA-256 with several order of magnitude.

Figure 4:
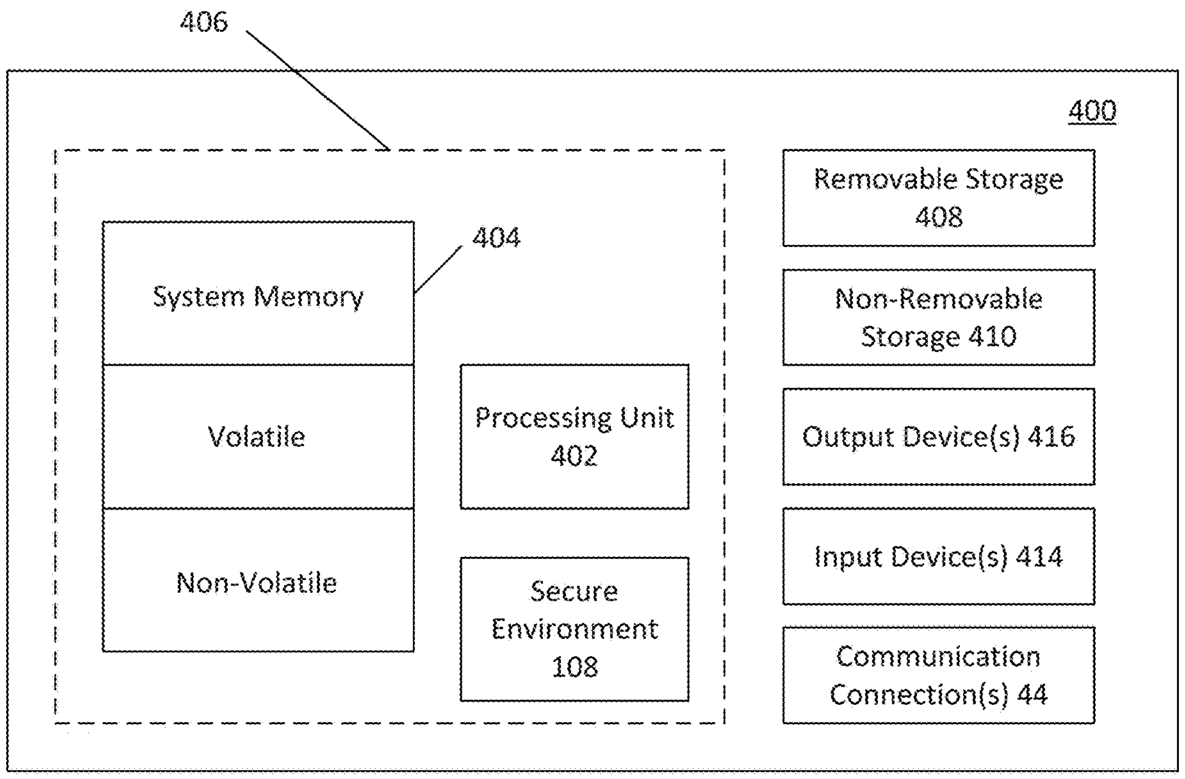
FIG. 4 shows am Example computing environment in which aspects of the present disclosure may be implemented according to certain embodiments.

FIG. 4 shows an example computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program components being executed by a computer, may be used. Generally, program modules include routines, programs, objects, components, data structures, etc., that perform particular tasks or implement particular abstract data types. Distributed computing environments may be used where tasks are performed by remote processing devices hat are linked through a communications network or other data transmission medium. In a distributed computing environment, program modules and other data may be located in both local and remote computer storage media, including memory storage devices.

With reference to FIG. 4, an example system for implementing aspects described herein includes a computing device, such as computing device 400. In its most basic configuration, the computing device 400 typically includes at least one processing unit 402 and memory 404. The device 400 may include the secure environment 108, described above. Depending on the exact configuration and type of computing device, memory 404 may be volatile (such as random access memory (RAM), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by the device 400 and includes both volatile and non-volatile media, removable and non-removable media.

Computer storage media include volatile and non-volatile, and removable and non-removable media implemented in any method or technology for storage of information such as computer-readable instructions, data structures, program modules or other data. Memory 404, removable storage 408, and non-removable storage 410 are all examples of non-transitory computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc., may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of generating a cryptographic signature in a heterogeneous system, comprising:

locally generating, at a signer, a hash on a message using a private seed of the signer and communicating the hash as a signature, the signer being a resource-limited device that does not receive the hash from another device or generate or store commitment values, public nonces and public keys;

the signer, using a hash-based algorithm to transform a signature HORS into an unbounded time signature;

at the signer, using a hash chain on a signer's private seed and incrementing a counter during each signature generation to provide a forward-secure multiple-time signature;

receiving the signature, the unbounded time signature and the forward-secure multiple-time signature at a verifier;

requesting, by the verifier, a public key and at least one public commitment that corresponds to the signer and the signature from a public key supplier that includes a trusted hardware environment; and providing, by the public key supplier and independently of the signer, the public key and the at least one public commitment to the verifier, wherein the trusted hardware environment of the public key supplier stores a master key from which per-signer keys are deterministically derived, and wherein the public key supplier provides standard cryptographic hash functions, and generates a public nonce, the public key, and commitments on behalf of the signer to reduce computational requirements at the signer.

2. The method of claim 1, further comprising performing the method without requiring secure hardware on the signer.

3. The method of claim 1, further comprising broadcasting messages and signatures from the signer without interacting with any other entity or conveying public keys.

4. The method of claim 1, wherein the verifier is an untrusted entity that receives signatures from the signers and public keys from the public key supplier.

5. The method of claim 1, wherein only a single round of requests is made by the verifier to the public key supplier to obtain the public key.

6. The method of claim 1, further comprising requesting the public key from the public key supplier asynchronously such that the verifier can obtain commitments from the public key supplier before signatures are generated by the signer.

7. The method of claim 1, further comprising generating a master key msk as a κ-bit string to be used as a private seed for an associated signer.

8. The method of claim 7, further comprising splitting an obtained hash value into k substrings {hi}N wherein each subset is of length log t.

9. The method of claim 1, further comprising performing signature verification by obtaining, by the verifier, the public key from the public key supplier using a function call.

10. The method of claim 9, further comprising initiating, by the verifier, a communication with the public key supplier prior to the signature verification process to request a batch of public keys.

11. The method of claim 1, further comprising storing pre-computed private seeds at the public key supplier to optimize a response time to the request from the verifier.

12. A system for generating a cryptographic signature in a heterogeneous computational environment, comprising:

a signer that locally generates a hash on a message using a private seed of the signer, wherein the hash is communicated as a signature, the signer being a resource-limited device that does not receive the hash from another device or generate or store commitment values, public nonces and public keys, wherein a hash-based algorithm is used to transform a signature HORS at the signer into an unbounded time signature, and wherein a hash chain is used on a signer's private seed and increment a counter during each signature generation to provide a forward-secure multiple-time signature;

a public key supplier that executes on secure hardware having a trusted hardware environment that provides standard cryptographic hash functions; and a verifier that receives the signature, the unbounded time signature and the forward-secure multiple-time signature and requests a public key and at least one public commitment that corresponds to the signer and the signature from the public key supplier, wherein the public key supplier that includes a trusted hardware environment and that stores a master key from which per-signer keys are deterministically derived, and wherein the public key supplier generates a public nonce, the public key, and commitments on behalf of the signer to reduce computational requirements at the signer.

13. The system of claim 12, wherein the signer lacks a trusted hardware environment.

14. The system of claim 12, wherein the signer broadcasts messages and signatures without interacting with any other entity or conveying public keys.

15. The system of claim 12, wherein the verifier is an untrusted entity that receives signatures from the signers and public keys from the public key supplier.

16. The system of claim 12, wherein the public key is requested from the public key supplier asynchronously such that the verifier can obtain commitments from the public key supplier before signatures are generated by the signer.

* * * * *